United States Patent
Gervais et al.

(10) Patent No.: US 10,912,246 B2
(45) Date of Patent: Feb. 9, 2021

(54) SYSTEM FOR CONTROLLING THE OPERATION OF AN ACTUATOR MOUNTED ON A SEED PLANTING IMPLEMENT

(71) Applicant: CNH Industrial Canada, Ltd., Saskatoon (CA)

(72) Inventors: Joel John Octave Gervais, Saskatoon (CA); Ian William Patrick Paulson, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 189 days.

(21) Appl. No.: 16/039,511

(22) Filed: Jul. 19, 2018

(65) Prior Publication Data
US 2020/0022300 A1  Jan. 23, 2020

(51) Int. Cl.
*A01B 63/32* (2006.01)
*A01C 5/06* (2006.01)
(Continued)

(52) U.S. Cl.
CPC ............ *A01B 63/32* (2013.01); *A01B 63/008* (2013.01); *A01C 5/062* (2013.01); *A01C 5/068* (2013.01); *F15B 11/10* (2013.01); *F15B 21/008* (2013.01); *F15B 2211/46* (2013.01); *F15B 2211/7053* (2013.01); *F15B 2211/8616* (2013.01)

(58) Field of Classification Search
CPC ......... A01B 63/32; A01B 63/24; A01B 63/14; A01B 63/00; A01B 63/008; A01B 63/002; A01C 5/062; A01C 5/06; A01C 5/00; A01C 5/068; A01C 5/066; F15B 11/10; F15B 11/08; F15B 11/00; F15B 21/008; F15B 21/00; F15B 2211/46; F15B 2211/40; F15B 2211/00; F15B 2211/7053; F15B 2211/7051; F15B 2211/705;
(Continued)

(56) References Cited

U.S. PATENT DOCUMENTS 3,653,446 A  4/1972  Kalmon
4,229,931 A  10/1980  Schlueter et al.
(Continued)

OTHER PUBLICATIONS

Precision Farming Dealer, Planter Downforce, Rfx Electro-Hydraulic Planter Row Unit Down Force, Nov. 11, 2015, 1 Page. www.precisionfarmingdealer.com/articles/1797-planter-downforce.

*Primary Examiner* — Christopher J. Novosad
(74) *Attorney, Agent, or Firm* — Rebecca L. Henkel; Rickard K. DeMille

(57) ABSTRACT

In one aspect, a system for controlling an operation of an actuator mounted on a seed planting implement may include an actuator configured to adjust a position of a row unit of the seed planting implement relative to a toolbar of the seed planting implement. The system may also include a flow restrictor fluidly coupled to a fluid chamber of the actuator, with the flow restrictor being configured to reduce a rate at which fluid is permitted to exit the fluid chamber in a manner that provides damping to the row unit. Furthermore, the system may include a valve fluidly coupled to the flow restrictor in a parallel relationship such that the valve is configured to permit the fluid exiting the fluid chamber to flow through the flow restrictor and the fluid entering the fluid chamber to bypass the flow restrictor.

12 Claims, 7 Drawing Sheets

(51) Int. Cl.
*A01B 63/00* (2006.01)
*F15B 11/10* (2006.01)
*F15B 21/00* (2006.01)

(58) Field of Classification Search
CPC .......... F15B 2211/70; F15B 2211/8616; F15B 2211/86; F15B 2211/80
See application file for complete search history.

(56) References Cited

U.S. PATENT DOCUMENTS

| | | |
|---|---|---|
| 7,401,561 B1 | 7/2008 | Kurz |
| 8,776,702 B2 | 7/2014 | Bassett |
| 8,857,580 B2 | 10/2014 | Marking |
| 9,226,440 B2 | 1/2016 | Bassett |
| 9,848,522 B2 | 12/2017 | Bassett |
| 2016/0128263 A1* | 5/2016 | Bassett ................. A01C 7/205 172/4 |
| 2017/0058918 A1 | 3/2017 | Maro |

* cited by examiner

SYSTEM FOR CONTROLLING THE OPERATION OF AN ACTUATOR MOUNTED ON A SEED PLANTING IMPLEMENT

FIELD

The present disclosure generally relates to seed planting implements and, more particularly, to systems for controlling the operation of an actuator mounted on a seed planting implement in a manner that provides damping to one or more components of the seed planting implement.

BACKGROUND

Modern farming practices strive to increase yields of agricultural fields. In this respect, seed planting implements are towed behind a tractor or other work vehicle to deposit seeds in a field. For example, seed planting implements typically include one or more ground engaging tools or openers that form a furrow or trench in the soil. One or more dispensing devices of the seed planting implement may, in turn, deposit seeds into the furrow(s). After deposition of the seeds, a packer wheel may pack the soil on top of the deposited seeds.

In certain instances, the packer wheel may also control the penetration depth of the furrow. In this regard, the position of the packer wheel may be moved vertically relative to the associated opener(s) to adjust the depth of the furrow. Additionally, the seed planting implement includes an actuator configured to exert a downward force on the opener(s) to ensure that the opener(s) is able to penetrate the soil to the depth set by the packer wheel. However, the seed planting implement may bounce or chatter when traveling at high speeds and/or when the opener(s) encounters hard or compacted soil. As such, operators generally operate the seed planting implement with the actuator exerting more downward force on the opener(s) than is necessary in order to prevent such bouncing or chatter. Operation of the seed planting implement with excessive down pressure applied to the opener(s), however, reduces the overall stability of the seed planting implement.

Accordingly, an improved system for controlling the operation of an actuator mounted on s seed planting implement to enhance the overall operation of the implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for controlling an operation of an actuator mounted on a seed planting implement. The system may include a toolbar and a row unit adjustably mounted on the toolbar. The system may also include a fluid-driven actuator configured to adjust a position of the row unit relative to the toolbar, with the fluid-driven actuator defining first and second fluid chambers. Furthermore, the system may include a flow restrictor fluidly coupled to the first fluid chamber, with the flow restrictor being configured to reduce a rate at which fluid is permitted to exit the first fluid chamber in a manner that provides viscous damping to the row unit. Additionally, the system may include a valve fluidly coupled to the first fluid chamber. The valve may further be fluidly coupled to the flow restrictor in a parallel relationship such that the valve is configured to permit the fluid exiting the first fluid chamber to flow through the flow restrictor and the fluid entering the first fluid chamber to bypass the flow restrictor.

In another aspect, the present subject matter is directed to a seed planting implement including a toolbar and a plurality of row units adjustably coupled to the toolbar. Each row unit may include a ground engaging tool configured to form a furrow in the soil. The seed planting implement may also include plurality of fluid-driven actuators, with each fluid-driven actuator being coupled between the toolbar and a corresponding row unit of the plurality of row units. As such, each fluid-driven actuator may be configured to adjust a position of the corresponding row unit relative to the toolbar. Moreover, each fluid-driven actuator may define first and second fluid chambers. Furthermore, the seed planting implement may include a flow restrictor fluidly coupled to the first fluid chamber of a first fluid-driven actuator of the plurality of fluid-driven actuators. The flow restrictor may be configured to reduce a rate at which fluid is permitted to exit the first fluid chamber of the first fluid-driven actuator in a manner that provides viscous damping to the corresponding row unit. Additionally, the seed planting implement may include a valve fluidly coupled to the first fluid chamber of the first fluid-driven actuator. The valve further may be fluidly coupled to the flow restrictor in a parallel relationship such that the valve is configured to permit the fluid exiting the first fluid chamber to flow through the flow restrictor and the fluid entering the first fluid chamber to bypass the flow restrictor.

In a further aspect, the present subject matter is directed to a system for providing damping to a row unit of a seed planting implement. The system may include a toolbar, a row unit adjustably mounted on the toolbar, and a fluid-driven actuator configured to adjust a position of the row unit relative to the toolbar. As such, the fluid-driven actuator may define a fluid chamber. The system may also include a flow restrictor fluidly coupled to the fluid chamber. The flow restrictor may define an adjustable throat configured to reduce a rate at which fluid is permitted to exit the fluid chamber. In this regard, the throat may be adjustable between a first size configured to provide a first damping rate to the row unit and a second size configured to provide a second damping rate to the row unit, with the first and second damping rates being different.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
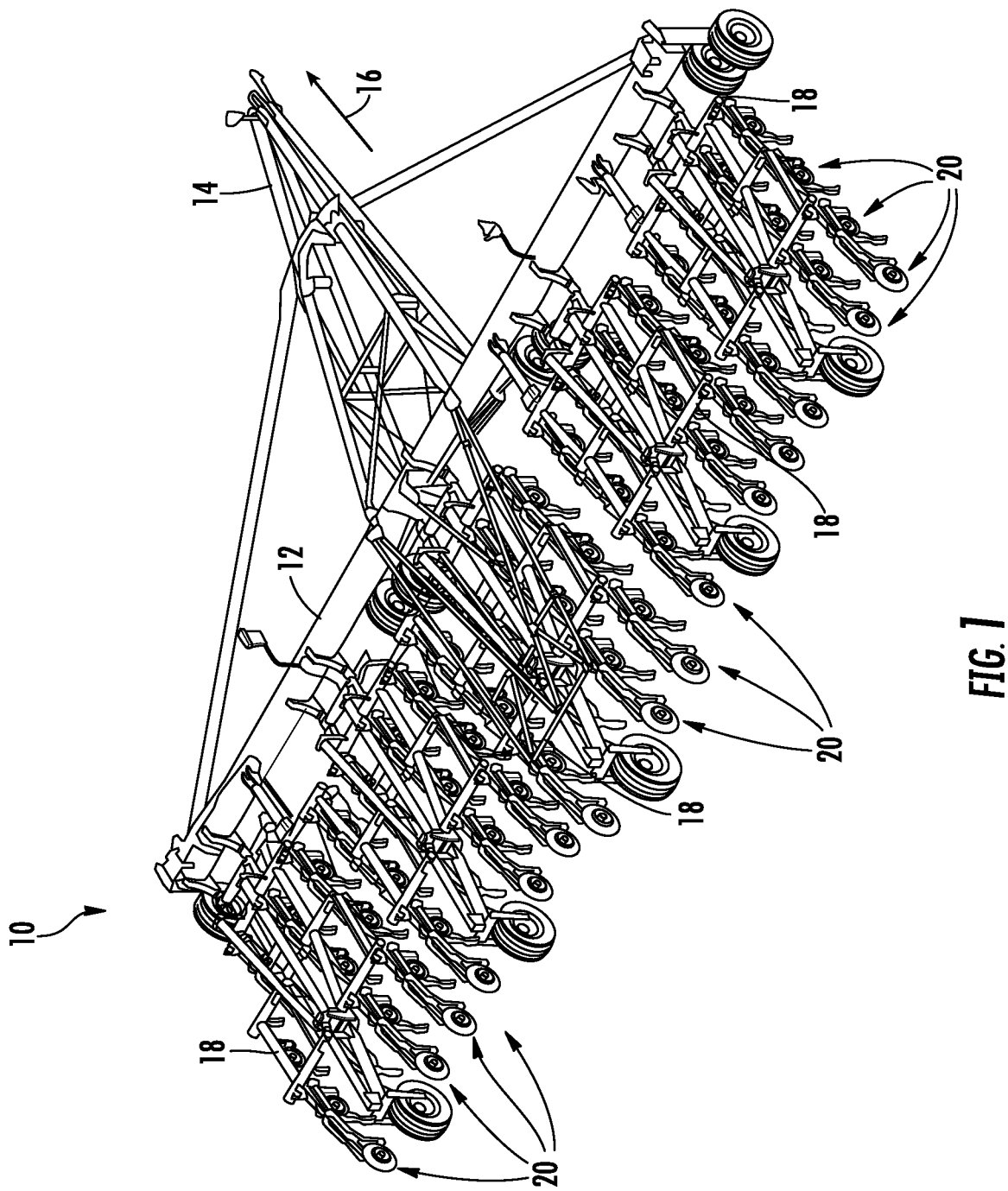
FIG. 1 illustrates a perspective view of one embodiment of a seed planting implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems for controlling the operation of an actuator mounted on a seed planting implement. Specifically, the disclosed systems may be configured to control the operation of the actuator in a manner that provides damping to one or more components of the seed planting implement. For example, in several embodiments, the seed planting implement may include a toolbar and one or more row units adjustably coupled to the toolbar. One or more fluid-driven actuators of the seed planting implement may be configured to control and/or adjust the position of the row unit(s) relative to the toolbar. Furthermore, a flow restrictor may be fluidly coupled to a fluid chamber of the actuator and configured to reduce the rate at which fluid is permitted to exit the fluid chamber so as to provide viscous damping to the row unit(s). In this regard, when the row unit(s) moves relative to the toolbar (e.g., when the row unit contacts a rock or other impediment in the soil), the flow restrictor may be configured to reduce the relative speed and/or displacement of such movement, thereby damping the movement of the row unit(s) relative to the toolbar.

In one embodiment, the flow restrictor may be configured to provide a variable damping rate to the component(s) of the seed planting implement. Specifically, in such embodiment, the flow restrictor may be configured as an adjustable valve having one or more components that may be adjusted to change the size of a fluid passage or throat defined by the valve. In this regard, changing the throat size of the valve varies the rate at which the fluid may exit the fluid chamber of the actuator, thereby adjusting the damping rate provided by the disclosed system. For example, adjusting the valve so as to increase the size of the throat may allow the fluid to exit the fluid chamber more quickly, thereby reducing the damping rate of the system. Conversely, adjusting the valve so as to decrease the size of the throat may allow the fluid to exit the fluid chamber more slowly, thereby increasing the damping rate of the system.

In accordance with aspects of the present subject matter, the system may further include a check valve fluidly coupled to the fluid chamber of the actuator. Specifically, in several embodiments, the check valve may also be fluidly coupled to the flow restrictor in a parallel relationship. As such, the check valve may be configured to direct the fluid exiting the fluid chamber of the actuator (e.g., when one of the row units hits a rock) to flow through the flow restrictor, thereby reducing the relative speed and/or displacement between the row unit(s) in the toolbar. Furthermore, the check valve may be configured to permit the fluid entering the fluid chamber to bypass the flow restrictor. For example, the fluid may return to the fluid chamber as the row unit(s) returns to its initial position following contact with the rock. In this regard, allowing the returning fluid to bypass the flow restrictor may increase the rate at which the fluid flows back into the fluid chamber, thereby further increasing the damping provided by the disclosed system.

Referring now to FIG. 1, a perspective view of one embodiment of a seed planting implement 10 is illustrated in accordance with aspects of the present subject matter. As shown in FIG. 1, the implement 10 may include a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16). The toolbar 12 may generally be configured to support a plurality of tool frames 18. Each tool frame 18 may, in turn, be configured to support a plurality of row units 20. As will be described below, each row unit 20 may include one or more ground engaging tools configured to excavate a furrow or trench in the soil.

It should be appreciated that, for purposes of illustration, only a portion of the row units 20 of the implement 10 have been shown in FIG. 1. In general, the implement 10 may include any number of row units 20, such as six, eight, twelve, sixteen, twenty-four, thirty-two, or thirty-six row units. In addition, it should be appreciated that the lateral spacing between row units 20 may be selected based on the type of crop being planted. For example, the row units 20 may be spaced approximately thirty inches from one another for planting corn, and approximately fifteen inches from one another for planting soybeans.

It should also be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
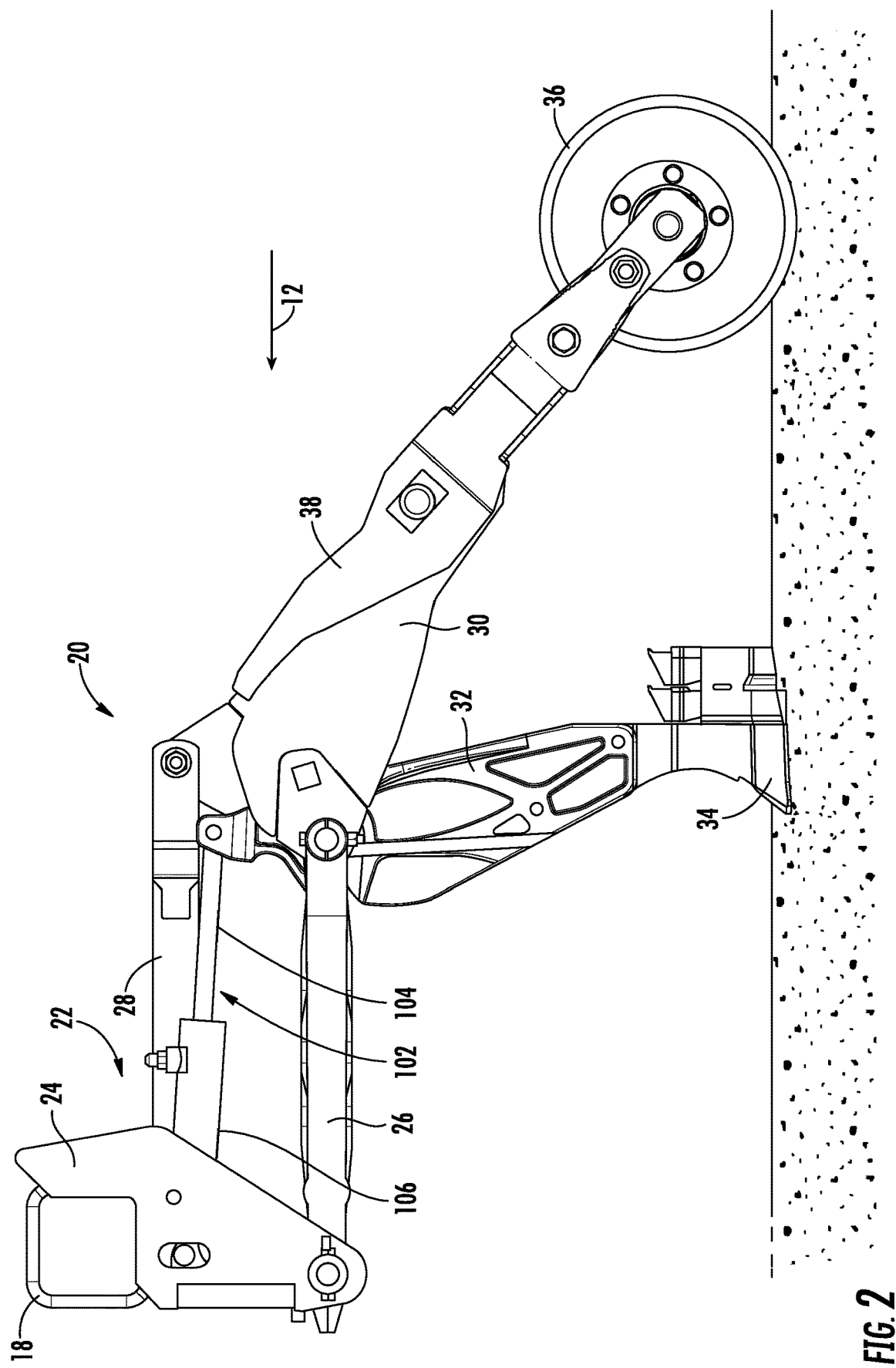
FIG. 2 illustrates a side view of one embodiment of a row unit suitable for use with a seed planting implement in accordance with aspects of the present subject matter.

Referring now to FIG. 2, a side view of one embodiment of a row unit 20 is illustrated in accordance with aspects of the present subject matter. As shown, the row unit 20 is configured as a hoe opener row unit. However, it should be appreciated that, in alternative embodiments, the row unit 20 may be configured as a disc opener row unit or any other suitable type of seed planting unit. Furthermore, it should be appreciated that, although the row unit 20 will generally be described in the context of the implement 10 shown in FIG. 1, the row unit 20 may generally be configured to be installed on any suitable seed planting implement having any suitable implement configuration.

As shown, the row unit 20 may be adjustably coupled to one of the tool frames 18 of the implement 10 by a suitable linkage assembly 22. For example, in one embodiment, the linkage assembly 22 may include a mounting bracket 24 coupled to the tool frame 18. Furthermore, the linkage assembly 22 may include first and second linkage members 26, 28. One end of each linkage member 26, 28 may be pivotably coupled to the mounting bracket 24, while an opposed end of each linkage member 26, 28 may be pivotally coupled to a support member 30 of the row unit 20. In this regard, the linkage assembly 22 may form a four bar linkage with the support member 30 that permits relative pivotable movement between the row unit 20 and the associated tool frame 18. However, it should be appreciated that, in alternative embodiments, the row unit 20 may be adjustably coupled to the tool frame 18 or the toolbar 12 via any other suitable linkage assembly. Furthermore, it should be appreciated that, in further embodiments the linkage assembly 22 may couple the row unit 20 directly to the toolbar 12.

Furthermore, the support member 30 may be configured to support one or more components of the row unit 20. For example, in several embodiments, a ground engaging shank 32 may be mounted or otherwise supported on support member 22. As shown, the shank 32 may include an opener 34 configured to excavate a furrow or trench in the soil as the implement 10 moves in the direction of travel 12 to facilitate deposition of a flowable granular or particulate-type agricultural product, such as seed, fertilizer, and/or the like. Moreover, the row unit 20 may include a packer wheel 36 configured to roll along the soil and close the furrow after deposition of the agricultural product. In one embodiment, the packer wheel 36 may be coupled to the support member 30 by an arm 38. It should be appreciated that, in alternative embodiments, any other suitable component(s) may be supported on or otherwise coupled to the support member 30. For example, the row unit 20 may include a ground engaging disc opener (not shown) in lieu of the ground engaging shank 32.

Additionally, in several embodiments, a fluid-driven actuator 102 of the implement 10 may be configured to adjust the position of one or more components of the row unit 20 relative to the tool frame 18. For example, in one embodiment, a rod 104 of the actuator 102 may be coupled to the shank 32 (e.g., the end of the shank 32 opposed from the opener 34), while a cylinder 106 of the actuator 102 may be coupled to the mounting bracket 24. As such, the rod 104 may be configured to extend and/or retract relative to the cylinder 106 to adjust the position of the shank 32 relative to the tool frame 18, which, in turn, adjusts the force being applied to the shank 32. However, it should be appreciated that, in alternative embodiments, the rod 104 may be coupled to the mounting bracket 24, while the cylinder 106 may be coupled to the shank 32. Furthermore, it should be appreciated that, in further embodiments, the actuator 102 may be coupled to any other suitable component of the row unit 20 and/or directly to the toolbar 12.

Moreover, it should be appreciated that the configuration of the row unit 20 described above and shown in FIG. 2 is provided only to place the present subject matter in an exemplary field of use. Thus, it should be appreciated that the present subject matter may be readily adaptable to any manner of seed planting unit configuration.

Figure 3:
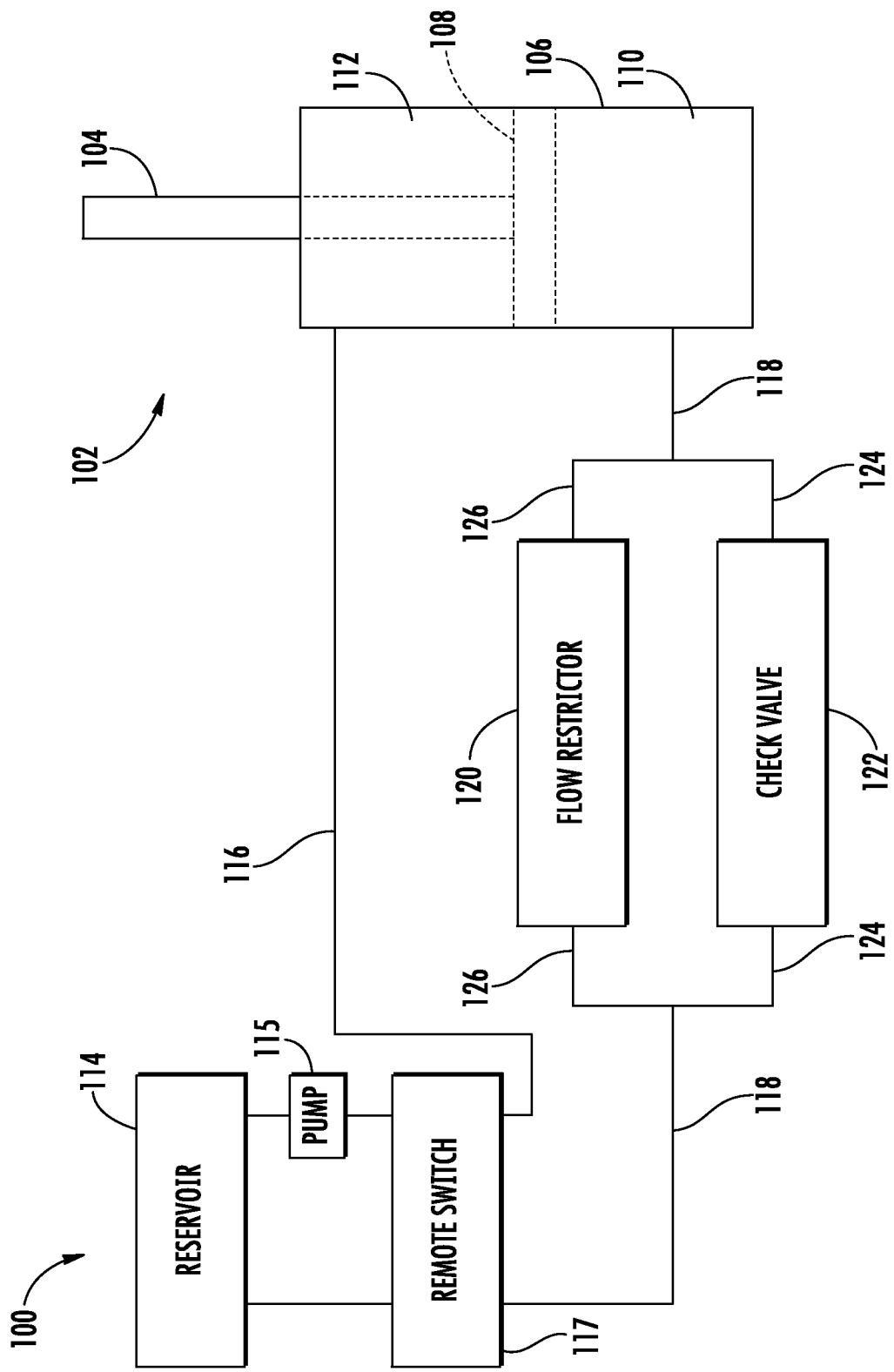
FIG. 3 illustrates a schematic view of one embodiment of a system for controlling the operation of an actuator mounted on a seed planting implement in accordance with aspects of the present subject matter.

Referring now to FIG. 3, a schematic view of one embodiment of a system 100 for controlling the operation of an actuator mounted on a seed planting implement is illustrated in accordance with aspects of the present subject matter. In general, the system 100 will be described herein with reference to the seed planting implement 10 and the row unit 20 described above with reference to FIGS. 1 and 2. However, it should be appreciated by those of ordinary skill in the art that the disclosed system 100 may generally be utilized with seed planting implements having any other suitable implement configuration and/or seed planting units having any other suitable unit configuration.

As shown in FIG. 3, the system 100 may include a fluid-driven actuator, such as the actuator 102 of the row unit 20 described above with reference to FIG. 2. As shown, the actuator 102 may correspond to a hydraulic actuator. Thus, in several embodiments, the actuator 102 may include a piston 108 housed within the cylinder 106. One end of the rod 104 may be coupled to the piston 108, while an opposed end of the rod 104 may extend outwardly from the cylinder 106. Additionally, the actuator 102 may include a cap-side chamber 110 and a rod-side chamber 112 defined within the cylinder 106. As is generally understood, by regulating the pressure of the fluid supplied to one or both of the cylinder chambers 110, 112, the actuation of the rod 104 may be controlled. However, it should be appreciated that, in alternative embodiments, the actuator 102 may be configured as any other suitable type of actuator, such as a pneumatic actuator. Furthermore, it should be appreciated that, in further embodiments, the system 100 may include any other suitable number of fluid-driven actuators, such as additional actuators 102 mounted on the implement 10.

Furthermore, the system 100 may include various components configured to provide fluid (e.g., hydraulic oil) to the cylinder chambers 110, 112 of the actuator 102. For example, in several embodiments, the system 100 may include a fluid reservoir 114 and first and second fluid conduits 116, 118. As shown, a first fluid conduit 116 may extend between and fluidly couple the reservoir 114 and the rod-side chamber 112 of the actuator 102. Similarly, a second fluid conduit 118 may extend between and fluidly couple the reservoir 114 and the cap-side chamber 110 of the actuator 102. Additionally, a pump 115 and a remote switch 117 or other valve(s) may be configured to control the flow of the fluid between the reservoir 114 and the cylinder chambers 110, 112 of the actuator 102. In one embodiment, the reservoir 114, the pump 115, and the remote switch 117 may be mounted on the work vehicle (not shown) configured to tow the implement 10. However, it should be appreciated that, in alternative embodiments, the reservoir 114, the pump 115, and/or the remote switch 117 may be mounted on the implement 10. Furthermore, it should be appreciated that the system 100 may include any other suit component(s) configured to control the flow of fluid between the reservoir and the actuator 102.

In several embodiments, the system 100 may also include a flow restrictor 120 that is fluidly coupled to the cap-side chamber 110. As such, the flow restrictor 120 may be provided in series with the second fluid conduit 118. As will be described below, the flow restrictor 120 may be configured to reduce the flow rate of the fluid exiting the cap-side chamber 110 in a manner that provides damping to one or more components of the implement 10. However, it should be appreciated that, in alternative embodiments, the flow restrictor 120 may be fluidly coupled to the rod-side chamber 120 such that the flow restrictor 120 is provided in series with the first fluid conduit 116.

Additionally, in several embodiments, the system 100 may include a check valve 122 that is fluidly coupled to the cap-side chamber 110 and provided in series with the second fluid conduit 118. As shown, the check valve 122 may be fluidly coupled to the flow restrictor 120 in parallel. In this regard, the check valve 122 may be provided in series with a first branch 124 of the second fluid conduit 118, while the flow restrictor 120 may be provided in series with a second branch 126 of the second fluid conduit 118. As such, the check valve 122 may be configured to allow the fluid to flow through the first branch 124 of the second fluid conduit 118 from the reservoir 114 to the cap-side chamber 110. However, the check valve 122 may be configured to occlude or prevent the fluid from flowing through the first branch 124 of the second fluid conduit 118 from the cap-side chamber 110 to the reservoir 114. In this regard, the check valve 122 directs all of the fluid exiting the cap-side chamber 110 into the flow restrictor 120. Conversely, the check valve 122 permits the fluid flowing to the cap-side chamber 110 to bypass the flow restrictor 120. As will be described below, such configuration facilitates damping of one or more components of the implement 10. However, it should be appreciated that, in alternative embodiments, the check valve 122 may be fluidly coupled to the rod-side chamber 112 in combination with the flow restrictor 120 such that the check valve 122 is provided in series with the first fluid conduit 116.

As indicated above, the system 100 may generally be configured to provide viscous damping to one or more components of the implement 10. For example, when a ground engaging tool of the implement 10, such as the shank 32, contacts a rock or other impediment in the soil, the corresponding row unit 20 may pivot relative to the corresponding tool frame 18 and/or the toolbar 12 against the down pressure load applied to the row unit 20 by the corresponding actuator 102. In several embodiments, such movement may cause the rod 104 of the actuator 102 to retract into the cylinder 106, thereby moving the piston 108 in a manner that decreases the volume of the cap-side chamber 110. In such instances, some of the fluid present within the cap-side chamber 110 may exit and flow into the second fluid conduit 118 toward the reservoir 114. The check valve 122 may prevent the fluid exiting the cap-side chamber 110 from flowing through the first branch 124 of the second fluid conduit 118. As such, all fluid exiting the cap-side chamber 110 may be directed into the second branch 126 and through the flow restrictor 120. As indicated above, the flow restrictor 120 reduces or limits the rate at which the fluid may flow through the second fluid conduit 118 so as to reduce the rate at which the fluid may exit the cap-side chamber 110. In this regard, the speed at which and/or the amount that the rod 104 retracts into the cylinder 106 when the shank 32 contacts a soil impediment may be reduced (e.g., because of the reduced rate at which the fluid is discharged from the cap-side chamber 110), thereby damping the movement of the row unit 20 relative to the corresponding tool frame 18 and/or the toolbar 12. Furthermore, after the initial retraction of the rod 104 into the cylinder 106, the piston 108 may then move in a manner that increases the volume of the cap-side chamber 110, thereby extending the rod 104 from the cylinder 106. In such instances, fluid present within the reservoir 114 and the second fluid conduit 118 may be drawn back into the cap-side chamber 110. As indicated above, the check valve 122 may permit the fluid within the second fluid conduit 118 to bypass the flow restrictor 120 and flow unobstructed through the first branch 124, thereby maximizing the rate at which the fluid returns to the cap-side chamber 110. Increasing the rate at which the fluid returns to the cap-side chamber 110 may decrease the time that the row unit 20 is displaced relative to the tool frame 18, thereby further damping of the row unit 20 relative to the corresponding tool frame 18 and/or the toolbar 12.

Figure 4:
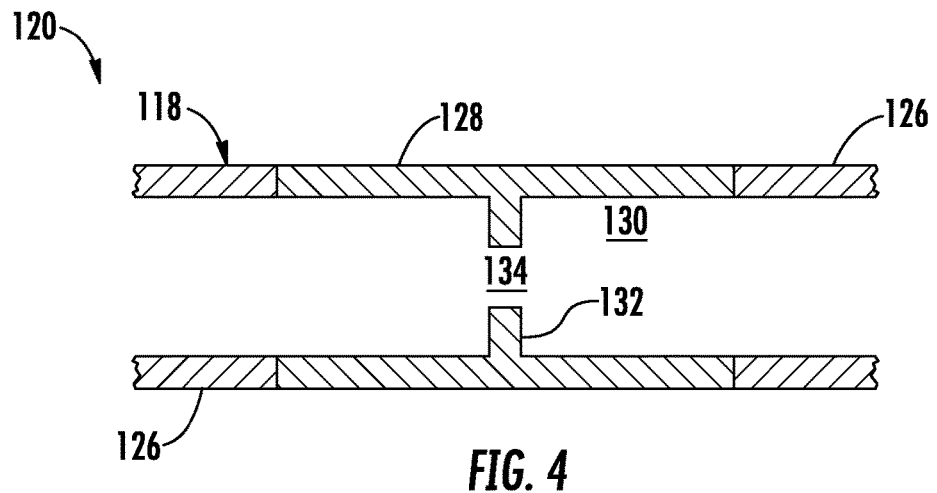
FIG. 4 illustrates a cross-sectional view of one embodiment of a flow restrictor suitable for use in the system shown in FIG. 3, particularly illustrating the flow restrictor defining a throat having a fixed size in accordance with aspects of the present subject matter.

Referring now to FIG. 4, a cross-sectional view of one embodiment of the flow restrictor 120 is illustrated in accordance with aspects of the present subject matter. For example, in the illustrated embodiment, the flow restrictor 120 may include a restrictor body 128 coupled to the second branch 126 of the second fluid conduit 118, with the restrictor body 128, in turn, defining a fluid passage 130 extending therethrough. Furthermore, the flow restrictor 120 may include an orifice plate 132 extending inward from the restrictor body 128 into the fluid passage 130. As shown, the orifice plate 132 may define a central aperture or throat 134 extending therethrough. In general, the size (e.g., the area, diameter, etc.) of the throat 134 may be smaller than the size of the fluid passage 130 so as to reduce the flow rate of the fluid through the flow restrictor 120. It should be appreciated that, in the illustrated embodiment, the throat 134 has a fixed size such that the throat 134 provides a fixed or constant backpressure for a given fluid flow rate. In this regard, in such embodiment, a fixed or constant damping rate is provided by the system 100. However, it should be appreciated that, in alternative embodiments, the flow restrictor 120 may have any other suitable configuration that reduces the flow rate of the fluid flowing therethrough.

Figure 5:
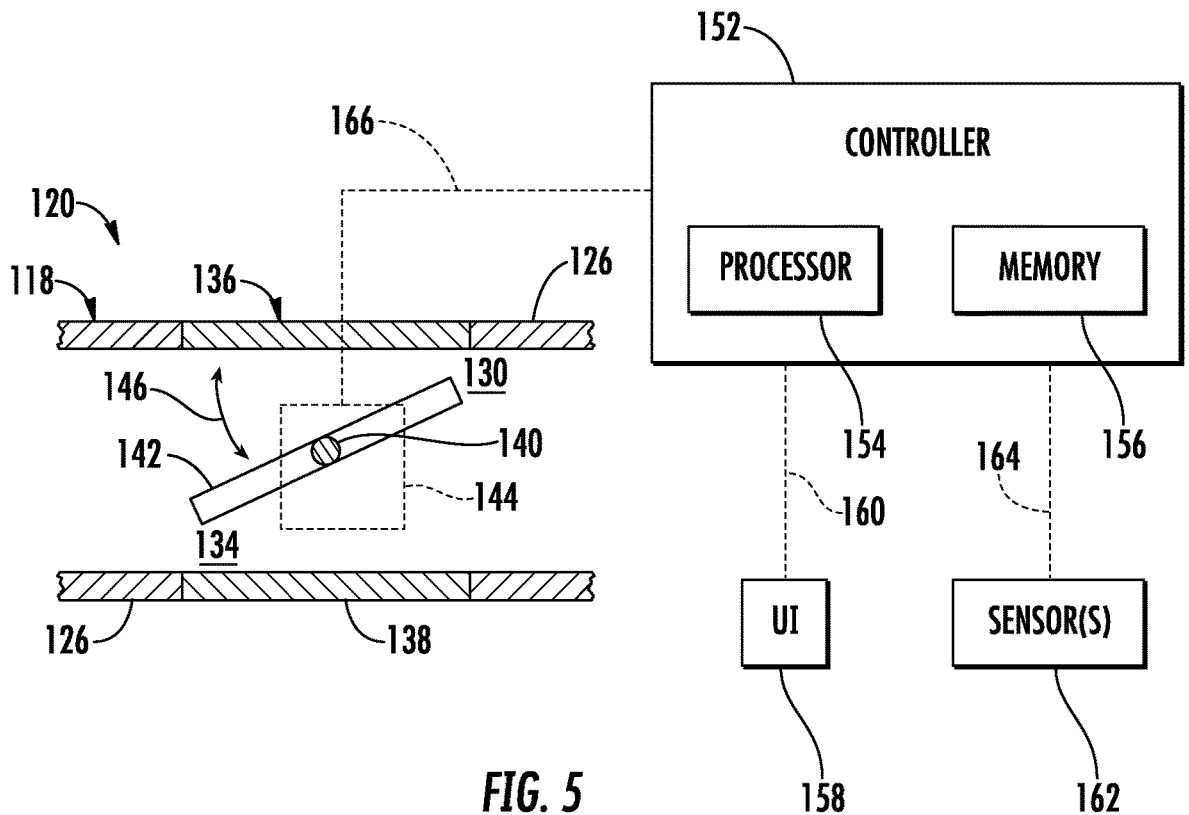
FIG. 5 illustrates a cross-sectional view of another embodiment of a flow restrictor suitable for use in the system shown in FIG. 3, particularly illustrating the flow restrictor defining a throat having an adjustable size in accordance with aspects of the present subject matter.

Referring now to FIG. 5, a cross-sectional view of another embodiment of the flow restrictor 120 is illustrated in accordance with aspects of the present subject matter. As shown, the flow restrictor 120 may generally be configured the same as or similar to that described above with reference to FIG. 4. For instance, the flow restrictor 120 may define the throat 134, which is configured to reduce the flow rate of the fluid through the flow restrictor 120. However, as shown in FIG. 5, unlike the above-describe embodiment, the size (e.g., the area, diameter, etc.) of the throat 134 is adjustable. For example, in such embodiment, the flow restrictor 120 may be configured as an adjustable valve 136. As shown, the valve 136 may include a valve body 138 coupled to the second branch 126 of the second fluid conduit 118, a shaft 140 rotatably coupled to the valve body 138, a disc 142 coupled to the shaft 140, and an actuator 144 (e.g., a suitable electric motor) coupled to the shaft 140. As such, the actuator 144 may be configured to rotate the shaft 140 and the disc 142 relative to the valve body 138 (e.g., as indicated by arrow 146 in FIG. 5) to change the size of the throat 134 defined between the disc 142 and the valve body 138. Although the valve 136 is configured as a butterfly valve in FIG. 5, it should be appreciated that, in alternative embodiments, the valve 136 may be configured as any other suitable type of valve or adjustable flow restrictor. For example, in one embodiment, the valve 136 may be configured as a suitable ball valve.

Figure 6:
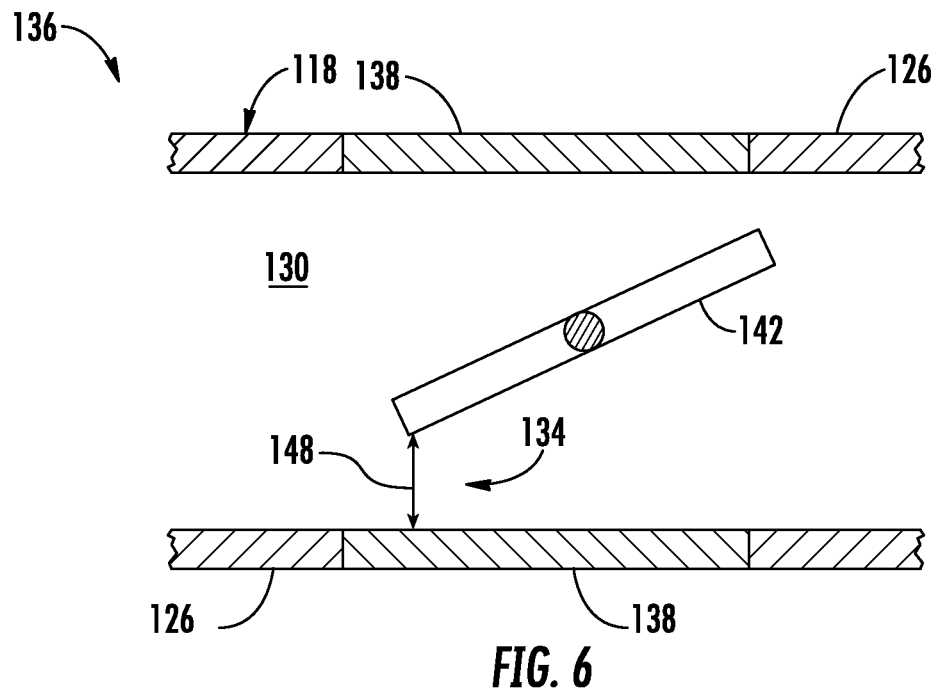
FIG. 6 illustrates a simplified cross-sectional view of the flow restrictor shown in FIG. 5, particularly illustrating the throat having a first size configured to provide a first damping rate in accordance with aspects of the present subject matter.
Figure 7:
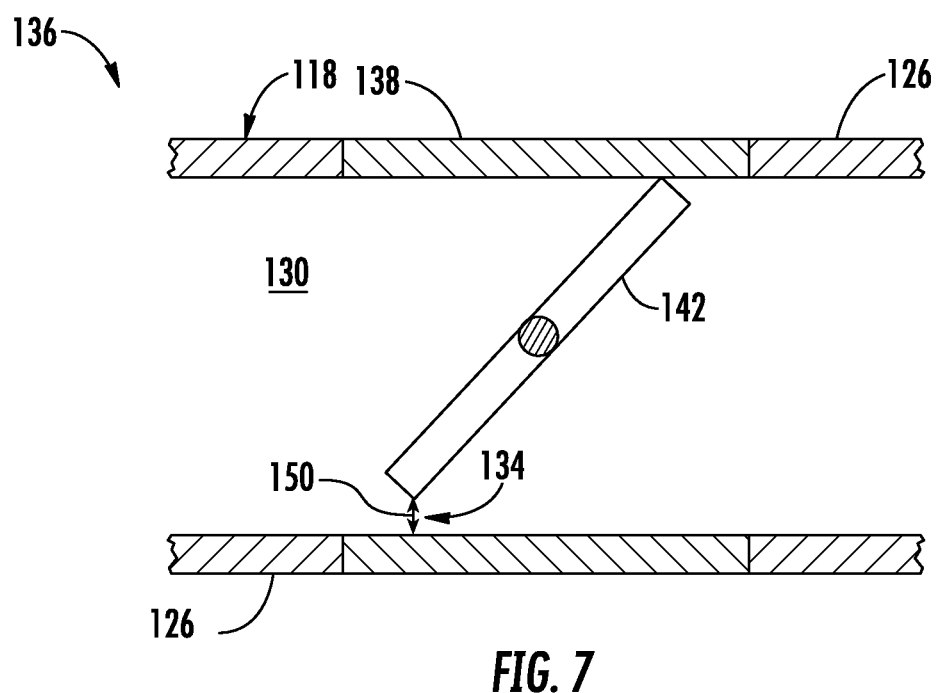
FIG. 7 illustrates a simplified cross-sectional view of the flow restrictor shown in FIG. 5, particularly illustrating the throat having a second size configured to provide a second damping rate in accordance with aspects of the present subject matter.

In accordance with aspects of the present disclosure, by adjusting the size of the throat 134, the system 100 may be able to provide variable damping rates. In general, the size of the throat 134 may be indicative of the amount of damping provided by the system 100. For example, in several embodiments, the disc 142 may be adjustable between a first position shown in FIG. 6 and a second position shown in FIG. 7. More specifically, when the disc 142 is at the first position, the throat 134 defines a first size (e.g., as indicated by arrow 148 in FIG. 6), thereby providing a first damping rate. Conversely, when the disc 142 is at the second position, the throat 134 defines a second size (e.g., as indicated by arrow 150 in FIG. 7), thereby providing a second damping rate. As shown in FIGS. 6 and 7, the first distance 148 is larger than the second distance 150. In such instance, the system 100 provides greater damping when the throat 134 is adjusted to the first size than when the throat 134 is adjusted to the second size. It should be appreciated that, in alternative embodiments, the disc 142 may be adjustable between any other suitable positions that provide any other suitable damping rates. For example, the disc 142 may be adjustable to a plurality of different positions defined between the fully opened and fully closed positions of the valve, thereby providing for a corresponding number of different damping rates. Furthermore, it should be appreciated that the disc 142 may be continuously adjustable or adjustable between various discrete positions.

Referring back to FIG. 5, a controller 152 of the system 100 may be configured to electronically control the operation of one or more components of the valve 138, such as the actuator 144. In general, the controller 152 may comprise any suitable processor-based device known in the art, such as a computing device or any suitable combination of computing devices. Thus, in several embodiments, the controller 152 may include one or more processor(s) 154 and associated memory device(s) 156 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 156 of the controller 152 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 156 may generally be configured to store suitable computer-readable instructions that, when implemented by the processor(s) 154, configure the controller 152 to perform various computer-implemented functions. In addition, the controller 152 may also include various other suitable components, such as a communications circuit or module, one or more input/output channels, a data/control bus and/or the like.

It should be appreciated that the controller 152 may correspond to an existing controller of the implement 10 or associated work vehicle (not shown) or the controller 152 may correspond to a separate processing device. For instance, in one embodiment, the controller 152 may form all or part of a separate plug-in module that may be installed within the implement 10 or associated work vehicle to allow for the disclosed system and method to be implemented without requiring additional software to be uploaded onto existing control devices of the implement 10 or associated work vehicle.

Furthermore, in one embodiment, a user interface 158 of the system 100 may be communicatively coupled to the controller 152 via a wired or wireless connection to allow feedback signals (e.g., as indicated by dashed line 160 in FIG. 5) to be transmitted from the controller 152 to the user interface 158. More specifically, the user interface 158 may be configured to receive an input from an operator of the implement 10 or the associated work vehicle, such as an input associated with a desired damping characteristic(s) to be provided by the system 100. As such, the user interface 158 may include one or more input devices (not shown), such as touchscreens, keypads, touchpads, knobs, buttons, sliders, switches, mice, microphones, and/or the like. In addition, some embodiments of the user interface 158 may include one or more one or more feedback devices (not shown), such as display screens, speakers, warning lights, and/or the like, which are configured to communicate such feedback from the controller 152 to the operator of the implement 10. However, in alternative embodiments, the user interface 158 may have any suitable configuration.

Moreover, in one embodiment, one or more sensors 162 of the system 100 may be communicatively coupled to the controller 152 via a wired or wireless connection to allow sensor data (e.g., as indicated by dashed line 164 in FIG. 5) to be transmitted from the sensor(s) 162 to the controller 152. For example, in one embodiment, the sensor(s) 162 may include a location sensor, such as a GNSS-based sensor, that is configured to detect a parameter associated with the location of the implement 10 or associated work vehicle within the field. In another embodiment, the sensor(s) 162 may include a speed sensor, such as a Hall Effect sensor, that is configured to detect a parameter associated with the speed at which the implement 10 is moved across the field. However, it should be appreciated that, in alternative embodiments, the sensor(s) 162 may include any suitable sensing device(s) configured to detect any suitable operating parameter of the implement 10 and/or the associated work vehicle.

In several embodiments, the controller 152 may be configured to control the operation of the valve 136 based on the feedback signals 160 received from the user interface 158 and/or the sensor data 164 received from the sensor(s) 162. Specifically, as shown in FIG. 5, the controller 152 may be communicatively coupled to the actuator 144 of the valve 136 via a wired or wireless connection to allow control signals (e.g., indicated by dashed lines 166 in FIG. 5) to be transmitted from the controller 152 to the actuator 144. Such control signals 166 may be configured to regulate the operation of the actuator 144 to adjust the position of the disc 142 relative to the valve body 138, such as by moving the disc 142 along the direction 146 between the first position (FIG. 6) and the second position (FIG. 7). For example, the feedback signals 116 received by the controller 152 may be indicative that the operator desires to adjust the damping provided by the system 100. Furthermore, upon receipt of the sensor data 164 (e.g., data indicative of the location and/or speed of the implement 10), the controller 152 may be configured to determine that the damping rate of the system 100 should be adjusted. In either instance, the controller 152 may be configured to transmit the control signals 166 to the actuator 144, with such control signals 166 being configured to control the operation of the actuator 144 to adjust the position of the disc 142 to provide the desired damping rate. However, it should be appreciated that, in alternative embodiments, the controller 152 may be configured to control the operation of the valve 136 based on any other suitable input(s) and/or parameter(s).

Figure 8:
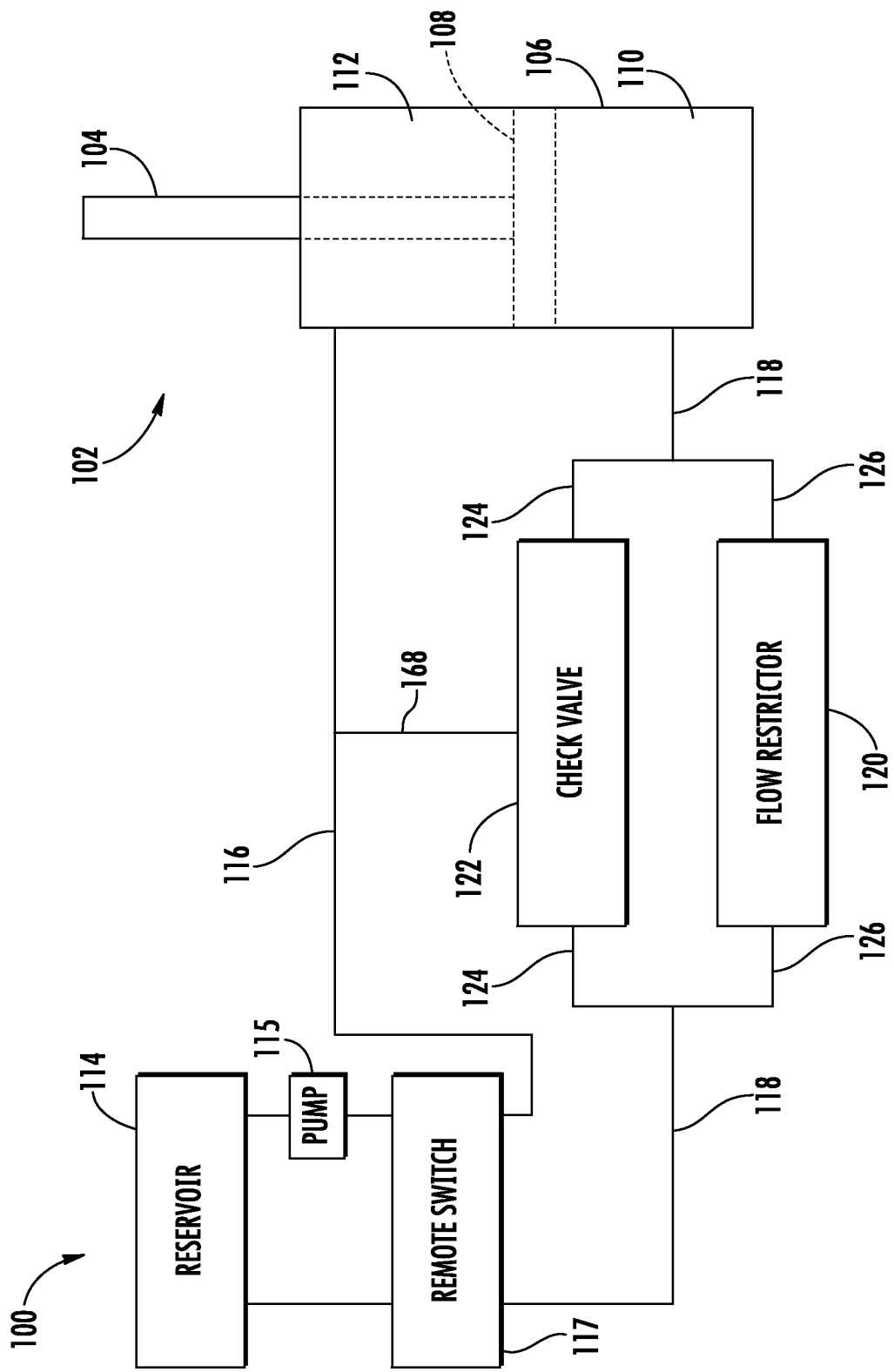
FIG. 8 illustrates a cross-sectional view of another embodiment of a system for controlling the operation of an actuator mounted on a seed planting implement in accordance with aspects of the present subject matter, particularly illustrating the system including a fluidly actuated check valve.

Referring now to FIG. 8, a schematic view of another embodiment of the system 100 is illustrated in accordance with aspects of the present subject matter. As shown, the system 100 may generally be configured the same as or similar to that described above with reference to FIG. 3. For instance, the system 100 may include the flow restrictor 120 and the check valve 122 fluidly coupled to the cap-side chamber 110 of the actuator 102 via the second fluid conduit 118. Furthermore, the flow restrictor 120 and the check valve 122 may be fluidly coupled together in parallel. However, as shown in FIG. 8, unlike the above-describe embodiment, the check valve 122 may be configured as a pilot-operated or fluid actuated three-way valve that is fluidly coupled to the first fluid conduit 116 by a pilot conduit 168.

In general, when the row unit 20 is lifted from an operational position relative to the ground to a raised position relative to the ground, it may be desirable for fluid to exit the cap-side chamber 110 without its flow rate being limited by the flow restrictor 120. For example, permitting such fluid to bypass the flow restrictor 120 may reduce the time required to lift the row unit 20 from the operational position to the raised position. More specifically, when lifting the row unit 20 from the operational position to the raised position, a pump (not shown) may pump fluid through the first fluid conduit 116 from the reservoir 114 to the rod-side chamber 112 of the actuator 102, thereby retracting the rod 104 into the cylinder 106. This may, in turn, discharge fluid from the cap-side chamber 110 into the second fluid conduit 118. As described above, the check valve 122 may generally be configured to direct all fluid exiting the cap-side chamber 110 into the flow restrictor 120. However, in the configuration of the system 100 shown in FIG. 8, when lifting the row unit 20 to the raised position, the pilot conduit 168 supplies fluid flowing through the first fluid conduit 116 to the check valve 122. The fluid received from the pilot conduit 168 may, in turn, actuate suitable component(s) of the check valve 122 (e.g., a diaphragm(s), a spring(s), and/or the like) in a manner that causes the check valve 122 to open, thereby permitting the fluid exiting the cap-side chamber 110 to bypass the flow restrictor 120 and flow unobstructed through the check valve 122 toward the reservoir 114. Conversely, when the row unit 20 is at the operational position, the check valve 122 may be closed, thereby directing all fluid exiting the cap-side chamber 110 into the flow restrictor 120.

Figure 9:
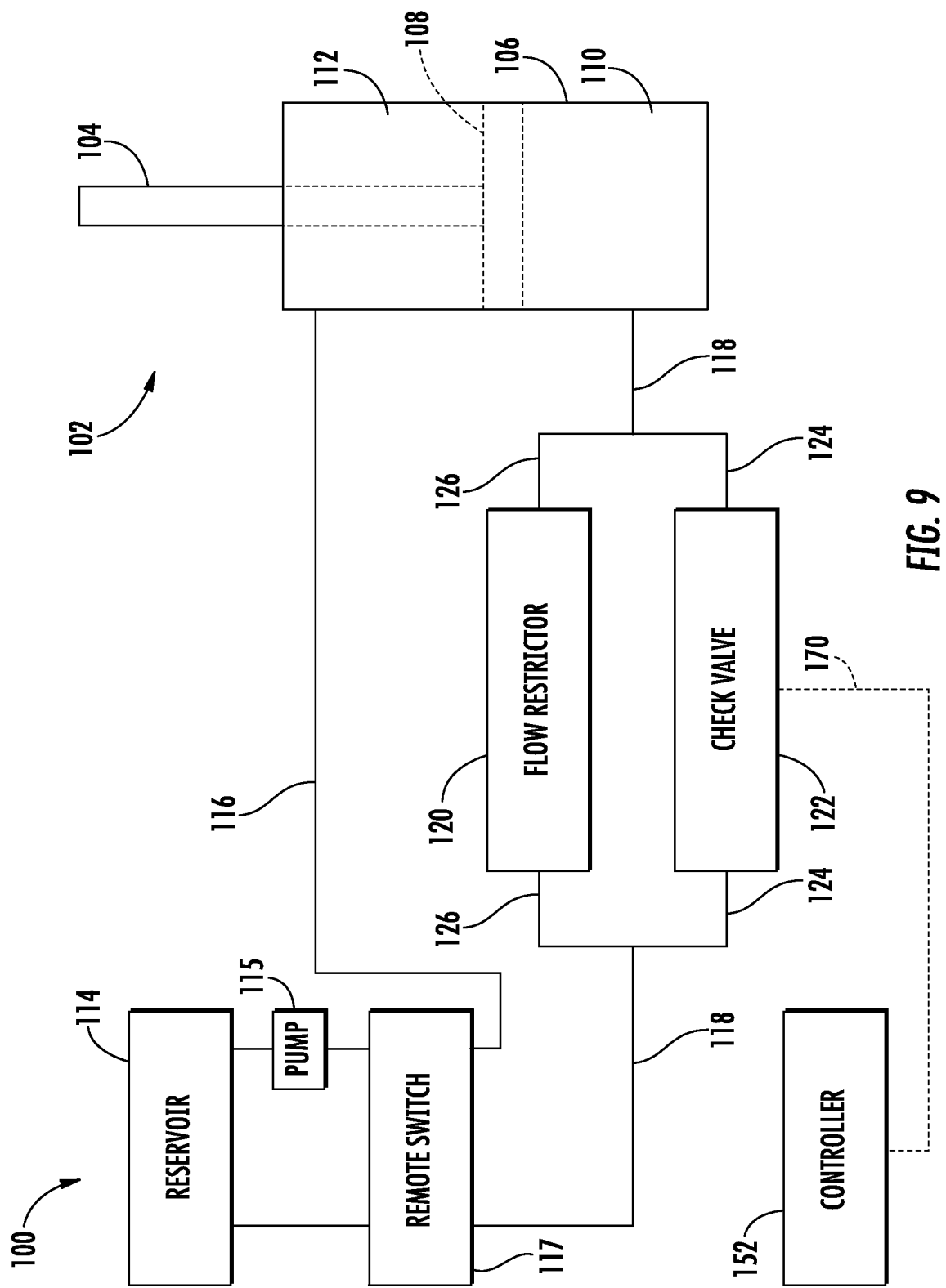
FIG. 9 illustrates a cross-sectional view of a further embodiment of a system for controlling the operation of an actuator mounted on a seed planting implement in accordance with aspects of the present subject matter, particularly illustrating the system including an electrically actuated check valve.

Referring now to FIG. 9, a schematic view of a further embodiment of the system 100 is illustrated in accordance with aspects of the present subject matter. As shown, the system 100 may generally be configured the same as or similar to that described above with reference to FIGS. 3 and 8. For instance, the system 100 may include the flow restrictor 120 and the check valve 122 fluidly coupled to the cap-side chamber 110 of the actuator 102 via the second fluid conduit 118. Furthermore, the flow restrictor 120 and the check valve 122 may be fluidly coupled together in parallel. However, as shown in FIG. 9, unlike the above-describe embodiments, the check valve 122 may be configured as an electrically actuated valve. Specifically, as shown, the controller 152 may be communicatively coupled to the check valve 122 via a wired or wireless connection to allow control signals (e.g., indicated by dashed lines 170 in FIG. 9) to be transmitted from the controller 152 to the check valve 122. In this regard, when the row unit 20 is lifted from the operational position to the raised position, the control signals 170 may be configured to instruct the check valve 122 to open in a manner that permits the fluid exiting the cap-side chamber 110 to bypass the flow restrictor 120 and flow unobstructed through the check valve 122 toward the reservoir 114. Conversely, when the row unit 20 is at the operational position, the control signals 170 may be configured to instruct the check valve 122 to close, thereby directing all fluid exiting the cap-side chamber 110 into the flow restrictor 120.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for controlling an operation of an actuator mounted on a seed planting implement, the system comprising:
   a toolbar;
   a row unit adjustably mounted on the toolbar;
   a fluid-driven actuator configured to adjust a position of the row unit relative to the toolbar, the fluid-driven actuator defining first and second fluid chambers;
   a flow restrictor fluidly coupled to the first fluid chamber, the flow restrictor being configured to reduce a rate at which fluid is permitted to exit the first fluid chamber in a manner that provides damping to the row unit;
   a valve fluidly coupled to the first fluid chamber, the valve further being fluidly coupled to the flow restrictor in a parallel relationship such that the valve is configured to permit the fluid exiting the first fluid chamber to flow through the flow restrictor and the fluid entering the first fluid chamber to bypass the flow restrictor; and
   a fluid line configured to supply the fluid to the second fluid chamber.

2. The system of claim 1, wherein, when fluid is supplied to the second fluid chamber, the valve is configured to permit fluid exiting the first fluid chamber to bypass the flow restrictor.

3. The system of claim 1, wherein the valve is fluidly actuated.

4. The system of claim 3,
   wherein the fluid line is fluidly coupled to the valve such that, when the fluid flows through the fluid line to the second fluid chamber, the valve opens in a manner that permits the fluid exiting first fluid chamber to bypass the flow restrictor.

5. The system of claim 1, wherein the valve is electrically actuated.

6. The system of claim 1, wherein the flow restrictor defines a throat having a fixed size.

7. The system of claim 1, wherein the flow restrictor defines a throat having an adjustable size.

8. A system for providing damping to a row unit of a seed planting implement, the system comprising:
   a toolbar;
   a row unit adjustably mounted on the toolbar;

a fluid-driven actuator configured to adjust a position of the row unit relative to the toolbar, the fluid-driven actuator defining first and second fluid chambers;

a flow restrictor fluidly coupled to the first fluid chamber, the flow restrictor defining an adjustable throat configured to reduce a rate at which fluid is permitted to exit the first fluid chamber, the throat being adjustable between a first size configured to provide a first damping rate to the row unit and a second size configured to provide a second damping rate to the row unit, the first and second damping rates being different; and a fluid line configured to supply the fluid to the second fluid chamber.

9. The system of claim 8, wherein the throat is adjustable between the first and second damping rates based on an operator input.

10. The system of claim 8, wherein the throat is adjustable between the first and second damping rates based on data received from one or more sensors on the seed planting implement.

11. The system of claim 8, further comprising:

a valve fluidly coupled to the first fluid chamber, the valve being configured to selectively occlude the flow of fluid such that fluid exiting the first fluid chamber flows through the flow restrictor and fluid entering the first fluid chamber bypasses the flow restrictor.

12. The system of claim 11, wherein the flow restrictor and the valve are fluidly coupled in a parallel relationship.

\* \* \* \* \*